United States Patent [19]
Kragolnik

[11] Patent Number: 5,812,311
[45] Date of Patent: Sep. 22, 1998

[54] MICROSCOPE HAVING EXTENDED SPECIMEN STAGE TRAVEL

[75] Inventor: Karl Kragolnik, Mödling, Austria

[73] Assignee: Leica AG, Austria

[21] Appl. No.: 782,453

[22] Filed: Jan. 13, 1997

[51] Int. Cl.⁶ .................................................. G02B 21/26
[52] U.S. Cl. .......................................... 359/393; 359/391
[58] Field of Search ..................................... 359/394, 393, 359/391, 392, 368

[56] References Cited

U.S. PATENT DOCUMENTS 4,283,111  8/1981  Wieber et al. ............................. 350/39
5,175,644  12/1992  Dosaka ..................................... 359/392

*Primary Examiner*—Jon W. Henry
*Attorney, Agent, or Firm*—Bean, Kauffman & Snyder

[57] ABSTRACT

A microscope with a C-shaped stand (1) for examining large-sized, disk-shaped objects (9), such as semiconductor wafers, comprises a base plate (2), a vertical portion (3) extending from the base plate, and a limb portion (4) extending forwardly from the top of the vertical portion. To achieve an ergonomic sitting position of an observer (B) and to be able to inspect the entire object surface, the vertical portion (3) has a forwardly opening slot-shaped recess (10) into which the object partially enters when it is at a rearmost position. The recess (10) is geometrically designed so as not to impair the stability of stand (1). In addition or as an alternative, a horizontally movable specimen stage (5) of the microscope includes a rearwardly opening recess (14) for partially receiving the vertical portion (3) when the stage is at its rearmost travel limit. The recess (14) may be U-shaped or specifically configured to correspond to the shape of the vertical portion (3 which it receives. The invention enables extended travel of the specimen stage (5) to bring the geometric center of specimen stage (5) and supported object (9) closer to vertical portion (3).

5 Claims, 2 Drawing Sheets

5,812,311

MICROSCOPE HAVING EXTENDED SPECIMEN STAGE TRAVEL

RELATED APPLICATIONS

Applicant claims priority under 35 U.S.C. 119 of German patent application no. 196 01 731.9-42 filed 19 Jan. 1996.

BACKGROUND

A. Field of the Invention

The present invention relates generally to illumination microscopes of the type having a C-shaped stand which is open and freely accessible toward an observer, and more particularly to a microscope of this type improved to permit extended movement of a specimen stage of the microscope.

B. Description of the Prior Art

C-shaped illumination microscopes, for instance that disclosed in German patent DE-C1-35 21 047, are often used for quality control in the electronics industry. In this regard, the main objects for examination are thin disks of semiconductor material, so-called "wafers".

To increase the number of integrated components on a wafer disk and thereby reduce the specific costs, the wafer diameter has constantly been increased in recent years. The related need for ever larger, more salient microscopes led to microscope designs that require additional supports to guarantee the required stability of the system.

An upright microscope is known from German patent DE-U1-90 04 328; it has a front support in the area of the observer's side, in such a way that a sort of "portal" stand shape is produced. Such an additional support indeed reduces inconvenient deformation and vibration influences, but at the same time it limits unrestricted manipulation by the observer. In addition, it prevents the observer, striving to maintain his or her ergonomic operating position, from having a direct, unhindered view of the object to be examined.

SUMMARY OF THE INVENTION

The technical problem of the present invention is therefore to increase the X-Y displacement area for C-shaped microscopes of the type mentioned above, which need only a small focus area, and with which thin, large surface objects are to be observed, in order to observe the entire surface of such objects without having to worry about the risk of mechanical instability in the microscope housing. This technical problem is solved by providing a forwardly opening recess in a vertical portion of the microscope stand for partially accommodating the object at its rearmost travel limit, and/or providing a rearwardly opening recess in the specimen stage of the microscope for partially accommodating the vertical portion when the stage and object are at the rearmost travel limit.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE PREFERRED EMBODIMENTS

Figure 1:
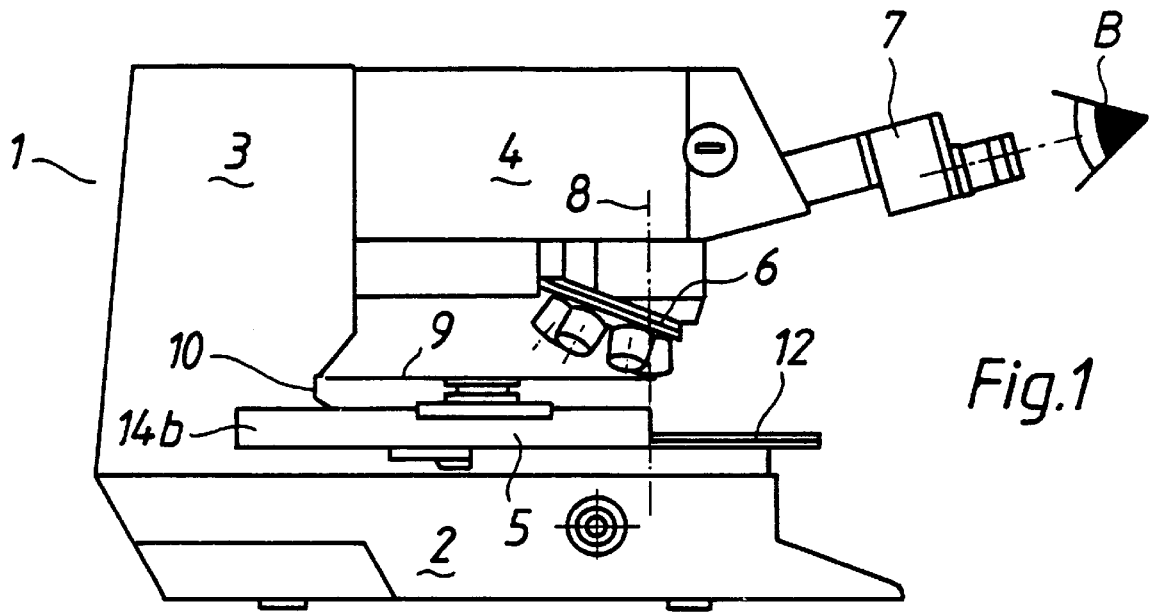
FIG. 1 is a side elevational view of a microscope formed in accordance with a preferred embodiment of the present invention.

In FIG. 1, a microscope is shown as generally having a C-shaped stand 1. The stand 1 comprises a base plate 2, a vertical portion 3, and a limb portion 4. On the base plate 2 there is mounted a specimen stage 5 illustrated as supporting a disk-shaped object 9 to be viewed by observer B. The limb portion 4 bears an eyepiece module 7 on its front side facing an observer B, and an objective module 6 on its bottom facing the object 9 and defining an optical axis represented by the reference number 8.

Specimen stage 5 supports object 9 and enables horizontal positioning of object 9, whereby observer B may selectively center a chosen region of object 9 on optical axis 8 to bring the chosen region within the field of view of the microscope. In the preferred embodiment, specimen stage 5 includes a slide bar 12 for slidably mounting the specimen stage on base plate 2 for horizontal movement along the X axis between foremost and rearmost travel limits, and a cross-slide 13 slidably mounted on the specimen stage for supporting object 9 to permit left-right (transverse) positioning of the object along the Y axis. A coaxial drive knob 11 is provided for both X and Y position adjustments.

Figure 2:
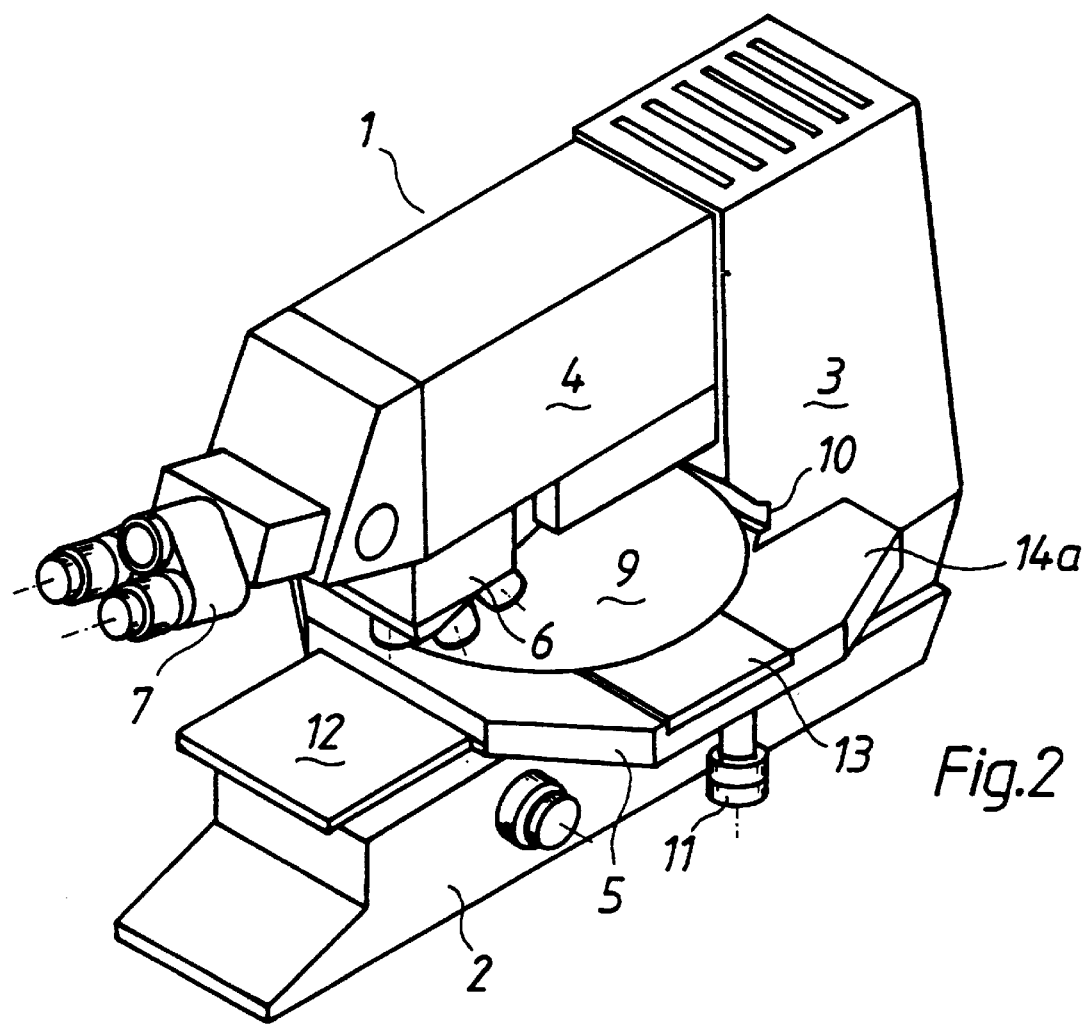
FIG. 2 is a perspective view thereof.

Object 9 is typically a disk-shaped semiconductor wafer of large surface area. As depicted in FIGS. 1 and 2, the peripheral area of object 9 closest to observer B is situated in the area of optical axis 8, i.e., this position is characterized in that the geometric center of specimen stage 5 is near vertical portion 3. In FIGS. 1 and 2 one recognizes that such a positioning for the purpose of examining the front periphery of object 9 is only possible because, according to the present invention, object 9 to a certain extent "penetrates" vertical portion 3. For this purpose a forwardly opening recess 10 is provided in vertical portion 3. Seen from above, this recess can be rectangular in shape. Seen from the side, recess 10 shows itself to be slot-shaped or slit shaped. Recess 10 is preferably designed with specific object dimensions in mind, whereby the cross-sectional geometry of recess 10 does not impair the stability of the microscope system in any significant manner.

Since large-sized objects also require specimen stages of like size, travel of the specimen stage 5 along the X axis in a rearward direction toward vertical portion 3 is extended in accordance with the present invention by provision of a rearwardly opening recess generally indicated as 14 for partially receiving vertical portion 3, whereby the geometric center of specimen stage 5 may be moved as closely as possible to vertical portion 3. According to an advantageous form of construction of the present invention, recess 14 can be U-shaped in such a way that specimen stage 5 is fork-shaped facing vertical portion 3. In FIG. 1, a left leg 14b defining a leg of U-shaped recess 14 can be seen, while in FIG. 2 a right leg 14a defining an opposite leg of the recess 14 can be seen. Both legs 14a and 14b are shown in the top plan view of FIG. 3. Recess 14 is preferably configured to correspond to the shape of vertical portion 3 received thereby, and may even be asymmetric, for example, such that recess 14 is no larger than necessary to achieve the desired extension of travel.

While the preferred embodiment of FIGS. 1 and 2 includes both forwardly opening recess 10 in vertical portion 3 and rearwardly opening recess 14 in specimen stage 5, alternative embodiments of the invention having one recess 10 or 14 but not the other are considered to be within the scope of the present invention.

Figure 3:
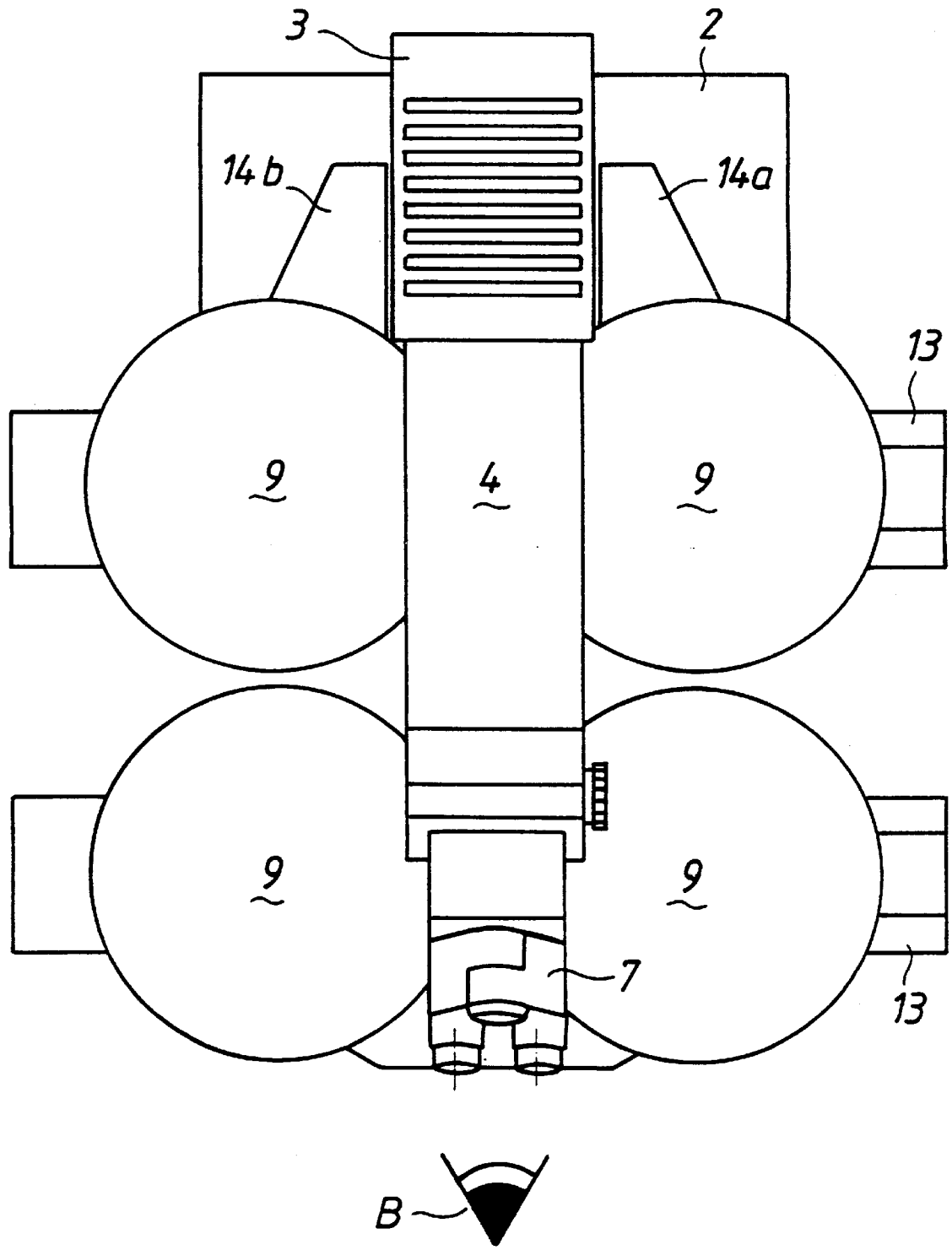
FIG. 3 is a top plan view of the thereof showing an object to be viewed in four different position extremes.

FIG. 3 shows all four travel limit positions of object 9. As seen by observer B, object 9 carried by cross-slide 13 may be moved between a rearmost and rightmost position RR, a rearmost and leftmost position RL, a foremost and leftmost position FL, and a foremost and rightmost position FR by means of the cross-slide 13 and slide bar 12. As will be appreciated, the microscope of the present invention enables examination of larger-surface wafers while maintaining previous microscope dimensions and without impairing the ergonomic sitting position of the observer B.

What is claimed is:

1. A microscope comprising:

a C-shaped stand open at its front toward an observer, said stand including a base, a rear vertical portion extending from said base, and a limb portion extending forward from said vertical portion;

an objective module mounted on said limb portion to define a generally vertical optical axis;

a front eyepiece module mounted on said-limb portion to face-said observer; and a specimen stage for supporting an object to be viewed and selectively centering a chosen region of said object on said optical axis for viewing by said observer, said specimen stage being slidably mounted on said base for horizontal movement relative to said base between foremost and rearmost travel limits;

said specimen stage having a rearwardly opening recess arranged to partially receive said vertical portion of said stand when said specimen stage is at said rearmost travel limit.

2. The microscope according to claim 1, wherein said rearwardly opening recess is configured to correspond to the shape of said vertical portion received thereby.

3. A microscope comprising:

a C-shaped stand open at its front toward an observer, said stand including a base, a rear vertical portion extending from said base, and a limb portion extending forward from said vertical portion;

an objective module mounted on said limb portion to define a generally vertical optical axis;

a front eyepiece module mounted on said limb portion to face said observer; and a specimen stage for supporting an object to be viewed and selectively centering a chosen region of said object on said optical axis for viewing by said observer, said specimen stage being slidably mounted on said base for horizontal movement relative to said base between foremost and rearmost travel limits;

said vertical portion having a forwardly opening recess arranged to partially receive said object when said specimen stage is at said rearmost travel limit, and said specimen stage having a rearwardly opening recess arranged to partially receive said vertical portion of said stand when said specimen stage is at said rearmost travel limit.

4. The microscope according to claim 3, wherein said forewardly opening recess is an elongated slot extending transversely of said vertical portion.

5. The microscope according to claim 3, wherein said rearwardly opening recess is configured to correspond to the shape of said vertical portion received thereby.

* * * * *

UNITED STATES PATENT AND TRADEMARK OFFICE
CERTIFICATE OF CORRECTION

PATENT NO. : 5,812,311
DATED : September 22, 1998
INVENTOR(S) : Karl Kragolnik

It is certified that error appears in the above-identified patent and that said Letters Patent is hereby corrected as shown below:

On the cover page, after "Filed: Jan. 13, 1997", please insert
—Foreign Application Priority Data
    Jan. 19, 1996 [DE] Germany.....................196 01 731.9---

Signed and Sealed this

Second Day of March, 1999

Attest:

Q. TODD DICKINSON

Attesting Officer    Acting Commissioner of Patents and Trademarks